(12) United States Patent
Dean (10) Patent No.: US 9,727,719 B2
(45) Date of Patent: *Aug. 8, 2017

(54) SYSTEM AND METHOD OF USING RFID TAG PROXIMITY TO GRANT SECURITY ACCESS TO A COMPUTER

(71) Applicant: INTERMEC IP CORP., Everett, WA (US)

(72) Inventor: Stephen Dean, Snohomish, WA (US)

(73) Assignee: INTERMEC IP CORP., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,559

(22) Filed: Feb. 12, 2016

(65) Prior Publication Data

US 2016/0171203 A1  Jun. 16, 2016

Related U.S. Application Data

(63) Continuation of application No. 12/359,130, filed on Jan. 23, 2009, now Pat. No. 9,264,231.

(60) Provisional application No. 61/023,731, filed on Jan. 25, 2008.

(51) Int. Cl.
| | | |
|---|---|---|
| G06F 21/35 | (2013.01) | |
| H04L 9/32 | (2006.01) | |
| G06K 7/10 | (2006.01) | |
| G07C 9/00 | (2006.01) | |
| G06F 21/62 | (2013.01) | |

(52) U.S. Cl.
CPC .......... G06F 21/35 (2013.01); G06F 21/6218 (2013.01); G06K 7/10366 (2013.01); G07C 9/00111 (2013.01); H04L 9/32 (2013.01); H04L 9/3226 (2013.01); G06F 2221/2141 (2013.01); H04L 2209/805 (2013.01)

(58) Field of Classification Search
CPC ................. G06F 21/35; G06F 21/6218; G06F 2221/2141; G07C 9/00111; H04L 9/32; H04L 2209/805; H04L 9/3226; G06K 7/10366

See application file for complete search history.

(56) References Cited

U.S. PATENT DOCUMENTS

| | | |
|---|---|---|
| 6,636,146 B1 | 10/2003 | Wehoski |
| 6,965,294 B1 | 11/2005 | Elliott et al. |
| 7,246,744 B2 | 7/2007 | O'Brien et al. |
| 7,545,271 B2 | 6/2009 | Jalkanen et al. |
| 2002/0174010 A1 | 11/2002 | Rice, III |
| 2003/0030542 A1 | 2/2003 | von Hoffmann |

(Continued)

OTHER PUBLICATIONS

"South African Technology Leads the World;" Hi-Tech Security Solutions—The Industry Journal for Security & Business Preofessionals; Technews; http://www.securitysa.com/news.aspx?pk1NewsID=230&pkICategoryID=22; Sep. 1999; 2 pp.

(Continued)

*Primary Examiner* — Michael Pyzocha
(74) *Attorney, Agent, or Firm* — Oliff PLC; R. Brian Drozd (57) ABSTRACT

A system and method of granting and removing a user's security access to applications on a computer using proximity of authorized RFID tags is disclosed. A user having an authorized RFID tag that is located near the computer will be granted access to pre-authorized applications.

14 Claims, 4 Drawing Sheets

(56) References Cited

U.S. PATENT DOCUMENTS

| | | | |
|---|---|---|---|
| 2003/0036398 A1 | 2/2003 | Asakawa | |
| 2003/0074575 A1 | 4/2003 | Hoberock et al. | |
| 2003/0208595 A1* | 11/2003 | Gouge | H04L 67/16 |
| | | | 709/225 |
| 2004/0064728 A1* | 4/2004 | Scheurich | G06F 21/32 |
| | | | 726/9 |
| 2004/0181695 A1* | 9/2004 | Walker | G06F 21/35 |
| | | | 726/4 |
| 2004/0250074 A1* | 12/2004 | Kilian-Kehr | G06F 21/35 |
| | | | 713/172 |
| 2005/0090267 A1 | 4/2005 | Kotzin | |
| 2005/0212676 A1 | 9/2005 | Steinberg | |
| 2005/0225427 A1 | 10/2005 | Bell et al. | |
| 2006/0064477 A1 | 3/2006 | Renkis | |
| 2006/0099965 A1* | 5/2006 | Aaron | H04M 1/72572 |
| | | | 455/456.3 |
| 2006/0123463 A1 | 6/2006 | Yeap et al. | |
| 2006/0140374 A1 | 6/2006 | Light et al. | |
| 2006/0169771 A1* | 8/2006 | Brookner | G06F 21/35 |
| | | | 235/382 |
| 2006/0236373 A1* | 10/2006 | Graves | G06F 19/327 |
| | | | 726/3 |
| 2006/0289648 A1 | 12/2006 | Shafer | |
| 2007/0008142 A1 | 1/2007 | Crowe et al. | |
| 2007/0013519 A1 | 1/2007 | Chung et al. | |
| 2007/0018785 A1 | 1/2007 | Chi | |
| 2007/0057057 A1 | 3/2007 | Andresky et al. | |
| 2007/0069030 A1 | 3/2007 | Sauerwein et al. | |
| 2007/0073513 A1 | 3/2007 | Posamentier | |
| 2007/0083915 A1* | 4/2007 | Janakiraman | G06F 21/316 |
| | | | 726/4 |
| 2007/0120643 A1 | 5/2007 | Lee | |
| 2007/0143499 A1* | 6/2007 | Chang | G06Q 10/10 |
| | | | 709/245 |
| 2007/0192851 A1 | 8/2007 | Onno et al. | |
| 2007/0205860 A1 | 9/2007 | Jones et al. | |
| 2007/0224980 A1 | 9/2007 | Wakefield | |
| 2007/0257795 A1 | 11/2007 | Overhultz | |
| 2008/0022290 A1 | 1/2008 | Ochiai et al. | |
| 2008/0046753 A1 | 2/2008 | Fusari | |
| 2008/0051986 A1 | 2/2008 | Amano et al. | |
| 2008/0077465 A1* | 3/2008 | Schimpf | G06Q 10/06 |
| | | | 705/7.26 |
| 2008/0109886 A1* | 5/2008 | Matsumoto | G06F 21/554 |
| | | | 726/5 |
| 2008/0204200 A1 | 8/2008 | Zhu et al. | |
| 2008/0222701 A1* | 9/2008 | Saaranen | H04L 63/0492 |
| | | | 726/3 |
| 2008/0238364 A1 | 10/2008 | Weber et al. | |
| 2008/0263675 A1 | 10/2008 | McIntyre | |
| 2009/0027203 A1* | 1/2009 | Cristache | G01S 13/876 |
| | | | 340/572.1 |
| 2009/0177782 A1 | 7/2009 | Blatherwick et al. | |
| 2009/0222914 A1* | 9/2009 | Ozawa | G06F 21/608 |
| | | | 726/21 |
| 2009/0237030 A1 | 9/2009 | Oh et al. | |
| 2009/0278492 A1 | 11/2009 | Shimizu et al. | |
| 2010/0066304 A1 | 3/2010 | Oshimi | |

OTHER PUBLICATIONS

Corner et al; "Zero-Interaction Authentication;" Department of Electrical Engineering and Computer Science; University of Michigan; 2002; 11 pp.

Disc Ice website—Automated PC Access Control and Data Protection; http://discice.com; accessed Oct. 17, 2009; 10 pp.

"Do you know the value of the Data on your PC?;" Information Security Exhibition; Disc Ice website; www.discice.com; Apr. 2008; 1 p.

"Discice Blue and Discice Green—Automated PC Access Control—RFID Technology;" Envoy Data website; http://www.envoydata.com/security/discice/discice_products_php; accessed Oct. 16, 2009; 7 pp.

"Notebook/Laptop Computer Accessories—Wireless USB Proximity Lock—Model # SEC4002RF;" Tripplite website; accessed Oct. 16, 2009; 1 p.

* cited by examiner

| User ID (410) | Application (420) | Permission (430) |
|---|---|---|
| 00001503 | application 1 | read |
|  | application 2 | read |
|  | application 5 | write |
|  |  |  |
| 00073822 | application 2 | read |
|  | application 6 | delete |
|  |  |  |
| 00930647 | all applications | read |
|  |  |  |
| 02581032 | application 5 | write |

SYSTEM AND METHOD OF USING RFID TAG PROXIMITY TO GRANT SECURITY ACCESS TO A COMPUTER

CROSS-REFERENCE TO RELATED APPLICATIONS

This is a Continuation of application Ser. No. 12/359,130 filed Jan. 23, 2009, which claims the benefit of U.S. Provisional Application No. 61/023,371 filed Jan. 24, 2008. The disclosure of the prior applications is hereby incorporated by reference herein in its entirety.

BACKGROUND

Different methods currently exist for restricting access to a computer. For example, a password or mobile key may be provided to an authorized user to permit the user to access a computer. The user must supply a password or mobile key upon logging in or when opening an application, otherwise access will be denied. However, security fraud may still be perpetrated with these security methods.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Described in detail below is a method of granting security access to a user possessing a pre-authorized RFID tag. The tag must be within a minimum read distance of an RFID reader coupled to, integrated in, or associated with the computer. If the tag identification number or other applicable data on the tag corresponds to the data stored in a security database, access is granted to the user.

Various aspects of the invention will now be described. The following description provides specific details for a thorough understanding and enabling description of these examples. One skilled in the art will understand, however, that embodiments of the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

A security access system for a computer which requires a user to be within a certain predetermined radius of a computer, for example three feet, may be used alone or in conjunction with other types of security access systems, such as passwords, mobile keys, and biometric sensors. Requiring a user to be physically located near a computer may be advantageous. For example, a remote hacker would not be able to access the computer. In addition, if the computer has a fixed location, it may be monitored by cameras or security guards, thus increasing the number of security layers available to detect security fraud.

Figure 1:
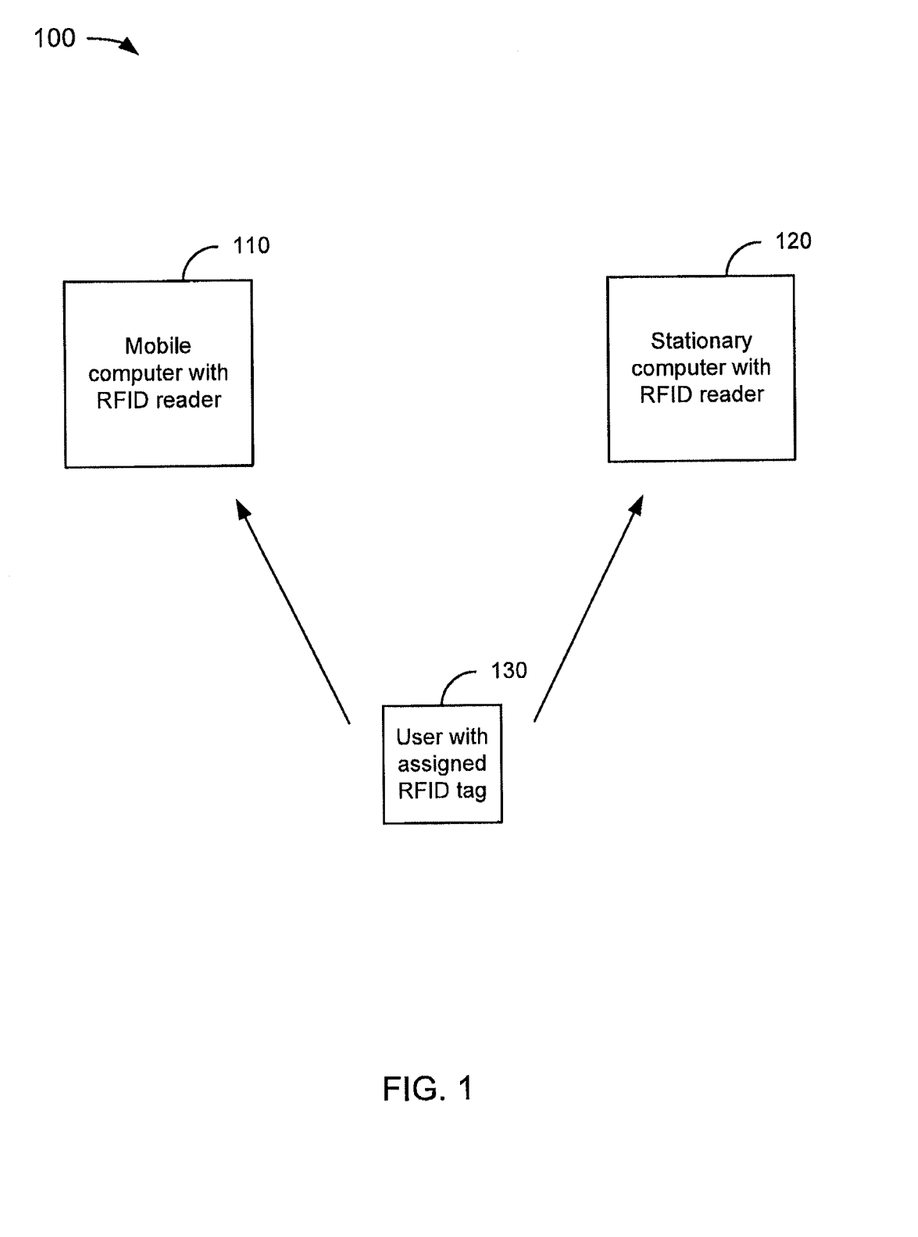
FIG. 1 depicts a block diagram for an example system using RFID tag proximity to grant security access to a computer.

As shown in FIG. 1, a security access system 100 requiring proximity to a computer may be established using an RFID reader and tag system. The computer to be protected, whether stationary 120 or mobile 110, may contain or be closely coupled to an RFID reader. Thus, RFID tags 130 within a certain radius of the RFID reader may also be substantially within the same radius of the computer. Users to be granted access to the computer may be provided RFID tags having stored therein pre-authorized identification numbers.

Figure 2:
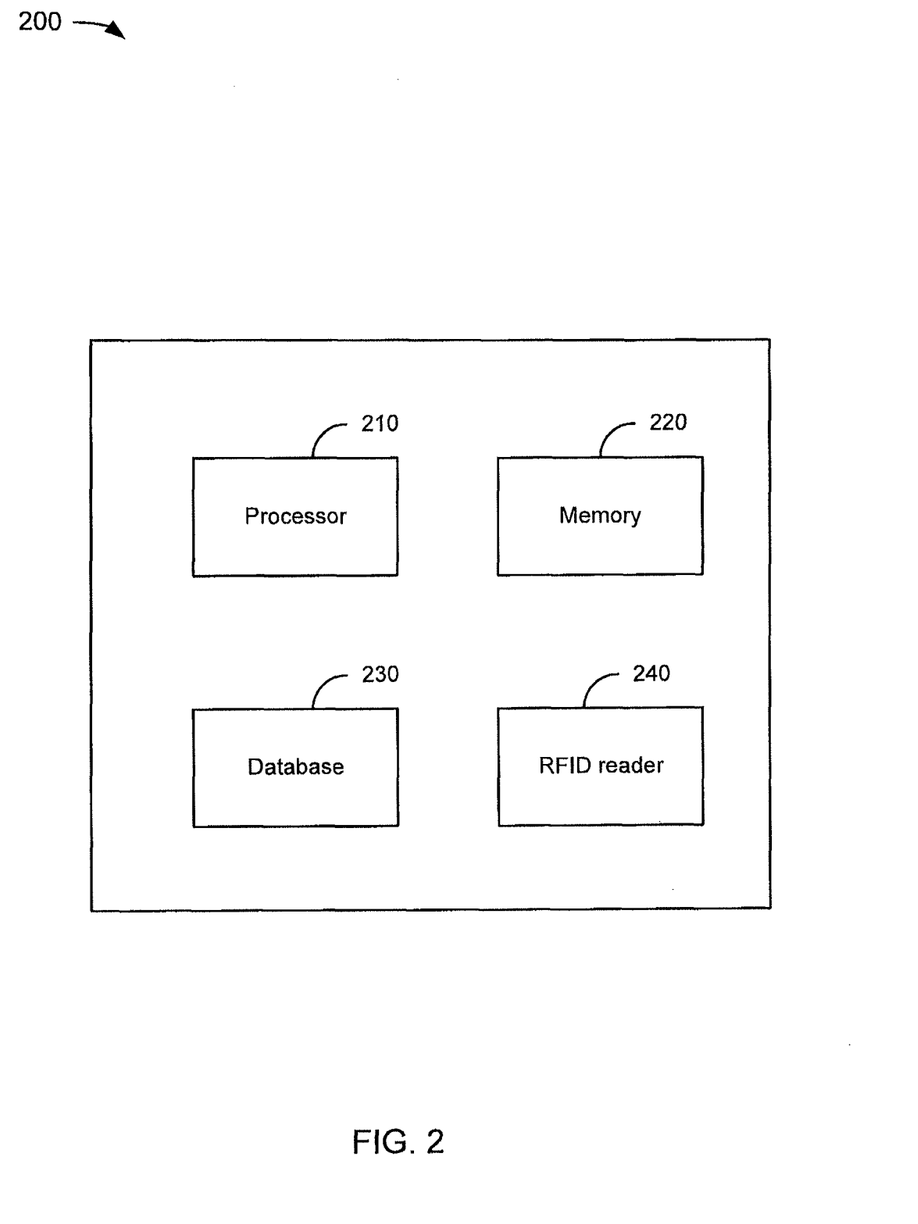
FIG. 2 shows a block diagram of an example computer that uses RFID tag proximity to grant security access.

An example of a block diagram of a computer system 200 is shown in FIG. 2; the system 200 is applicable to both the fixed computer 120 and mobile laptop computer 110. Note that FIGS. 1 and 2 and the associated discussion provide a brief, general description of a suitable computing environment in which techniques discussed herein can be implemented. Although not required, aspects of the invention are described in the general context of computer-executable instructions, such as routines executed by a general-purpose computer, e.g., stationary and mobile computers. Those skilled in the relevant art will appreciate that these concepts can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, server computers, and the like. Indeed, the terms "computer" and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. For example, the stationary computer 120 may be coupled via a network to other computers (not shown).

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

As shown in FIG. 2, the computer 200 includes the following elements for establishing an RFID tag proximity security system: one or more processors 210, memory units 220, a database 230, and an RFID reader 240. Of course, the computer 200 may include other elements (not shown), including input or output elements such as a printer, plotter, audio speakers, tactile or olfactory output devices, network connection, wireless transceiver, keyboard, pointing device (e.g. mouse), microphone, joystick, pen, game pad, scanner, digital camera, video camera, etc.

The processor 210 may run RFID reader applications that may be stored in the memory. The processor 210 may also compare identification data read from an RFID tag to security access information in a database 230. Memory 220 may include but is not limited to, RAM, ROM, and/or any combination of volatile and non-volatile memory. The database 230 may be stored in the memory, and may include RFID tag identification data for users authorized to access the computer or applications on the computer. Alternatively, the database 230 may contain other identifying tag information configurable on the RFID tags and readable by the RFID reader 240. The tag information may be either encrypted or not encrypted using known cryptographic protocols or RFID standards. If the information is encrypted, the processor 210 may decrypt the information read and stored by the RFID reader 240 in memory 220 by using a decryption key.

The RFID reader 240 includes at least one antenna for transmitting RF signals to RFID tags and/or scanning for or receiving RF signals from RFID tags. The RFID reader 240 reads identification data associated with RFID tags within range. The RFID reader 240 may be programmed to respond only to RFID tags within a selectable distance, for example three feet, although the range can certainly be adjusted to fit specific user needs. The RFID reader 240 may contain logic for determining the distance an RFID tag is from the reader based upon the received signal strength. Alternatively, the RFID reader 240 may include two or more antennas that have known separations. Based upon the signal strength received at each of the antennas and the lag time between detecting an RFID tag's presence at each antenna, it is possible to triangulate the location of the RFID tag to give higher resolution as to the proximity of the RFID tag from the reader. Alternatively or additionally, the tag 130 may be incorporated into another device, such as a mobile phone that has location determining capabilities, such as a global positioning system (GPS), where such determined location may be communicated to the computer 200 and/or the RFID reader 240. Indeed, the tag 130 may be incorporated into any device, or even into a human.

Figure 3:
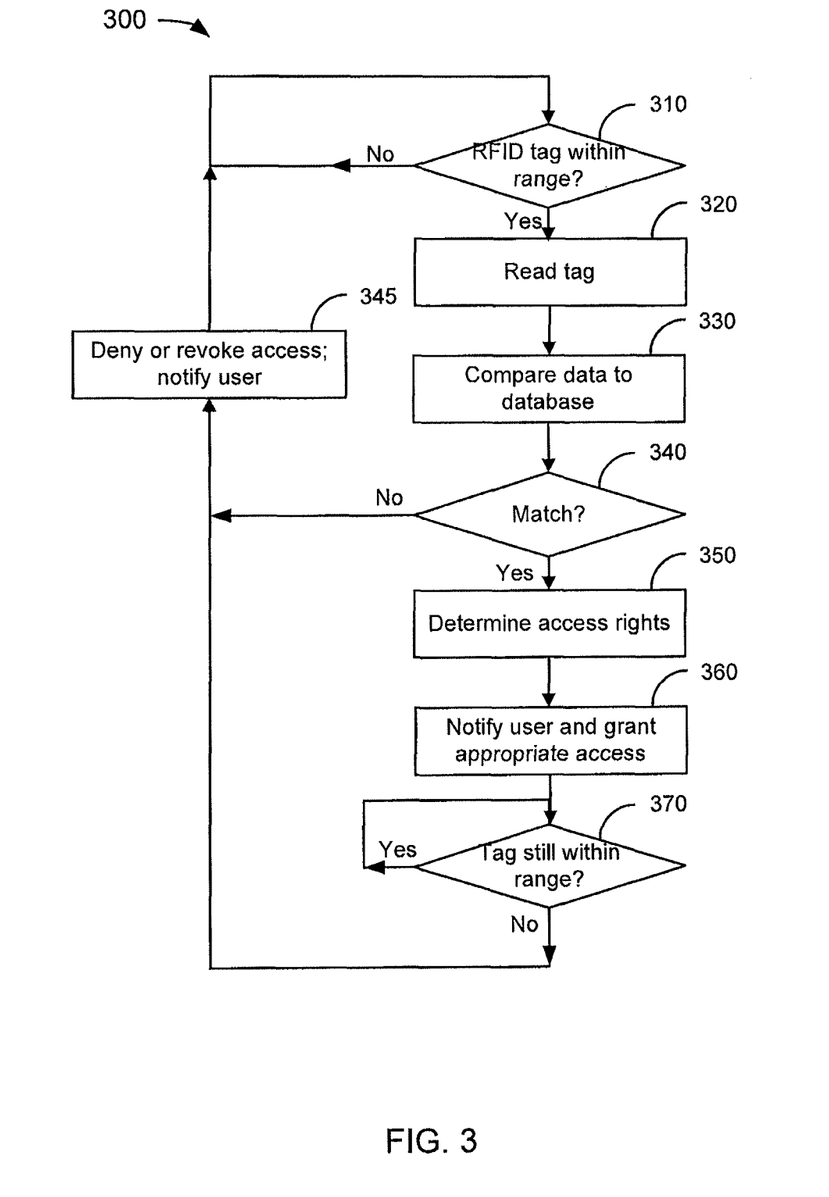
FIG. 3 is a flow chart illustrating an example of a method of granting security access to a computer using pre-authorized RFID tags.

FIG. 3 illustrates an example of a procedure 300 for granting security access to a user within a certain range of a particular computer. At decision block 310, the RFID reader determines whether an RFID tag is within a predetermined range of the reader attached to the computer. The reader may be searching at regular intervals, for example polling for RFID tags every half second. Alternatively, the RFID reader may be in a power save mode and prompted by a user to verify an RFID tag. If no tag is within range (block 310—No), the system remains at decision block 310, waiting and searching for an RFID tag to come within range.

If an RFID tag is within range (block 310—Yes), at block 320, the RFID reader reads the RFID tag which has come within range of the computer. The reader may be programmed to read the identification number of the RFID tag which is unique to every RFID tag. Alternatively, the reader may be programmed to read data from a configurable data area on the tag, where the data may or may not be encrypted. If the data is encrypted, the RFID reader or the attached computer has the key to decrypt the data.

At block 330, the data read by the RFID reader is compared to a database or file system of security access data. The database or file system may be local to the RFID reader, located in the computer attached to the reader, or even located in a remote repository at a server.

At decision block 340, the RFID reader or computer processor determines whether the data read from the RFID tag matches the security access data. If the data does not match (block 340—No), at block 345 access is denied to the user and the user is appropriately notified. The notification may be made upon the screen of the computer, on a separate display located near the computer, or announced verbally through a speaker. It will be apparent to a person skilled in the art that other notification methods may be used. The process then returns to decision block 310 where the RFID reader continues to search for other RFID tags within range.

If the data from the RFID tag matches the security access data (block 340—Yes), at block 350 the RFID reader or computer determines whether the user assigned the identified RFID tag is granted the right to access the computer. Alternatively, the security access data may indicate individual applications, databases, and/or files the user may be permitted to access.

At block 360, the appropriate access is granted to the user, and the user is notified. However, if the RFID tag proximity security system is used in conjunction with other security systems, the user must also satisfy the requirements of the other systems. For example, the user may still be required to enter a system password to access the computer or a password particular to an application or database to be granted access to that application or database.

Once a user has been granted access to the computer, application, or database on the computer, the user's RFID tag must stay within the predetermined proximity range of the RFID reader in order for the user to continue to access the computer, application, or database. Thus, at decision block 370, it is determined whether the RFID tag granted access is still within range of the reader. If the RFID tag remains within range (block 370—Yes), the user's access rights remain valid, and the system remains at decision block 370 to determine whether the RFID tag ever moves beyond the acceptable proximity range.

If the RFID tag, assumed to be attached to the assigned user, moves beyond the pre-set proximity range for the reader (block 370—No), the user's access rights are revoked at block 345. Methods by which this may be accomplished include, but are not limited to, blanking the screen, immediately logging the user off, providing a warning to return within range within a certain time period or risk being logged off. Additionally, the user is notified that the RFID tag is beyond the acceptable proximity range. The process then flows to decision block 310 where the RFID reader searches for the previously identified RFID tag and other RFID tags within range.

A scenario may exist where multiple RFID tags, for example three tags, come within range of the reader simultaneously. However, only two of the users associated with the three tags may have permission to access the computer, applications, or files on the computer. The system would then deny access to the two users who have access rights in order to prevent the third unauthorized user from obtaining any information, whether through eavesdropping or voluntarily offered by the authorized users. Thus, the RFID proximity system prevents authorized users from circumventing the security system without receiving authorization from an administrator or system manager responsible for assigning and distributing RFID tags authorizing access to the computer or its applications. Similarly, if an authorized user is working at a protected computer and an unauthorized user comes within range of the RFID reader, the system may blank the screen to prevent the unauthorized user from viewing any information.

Figure 4:
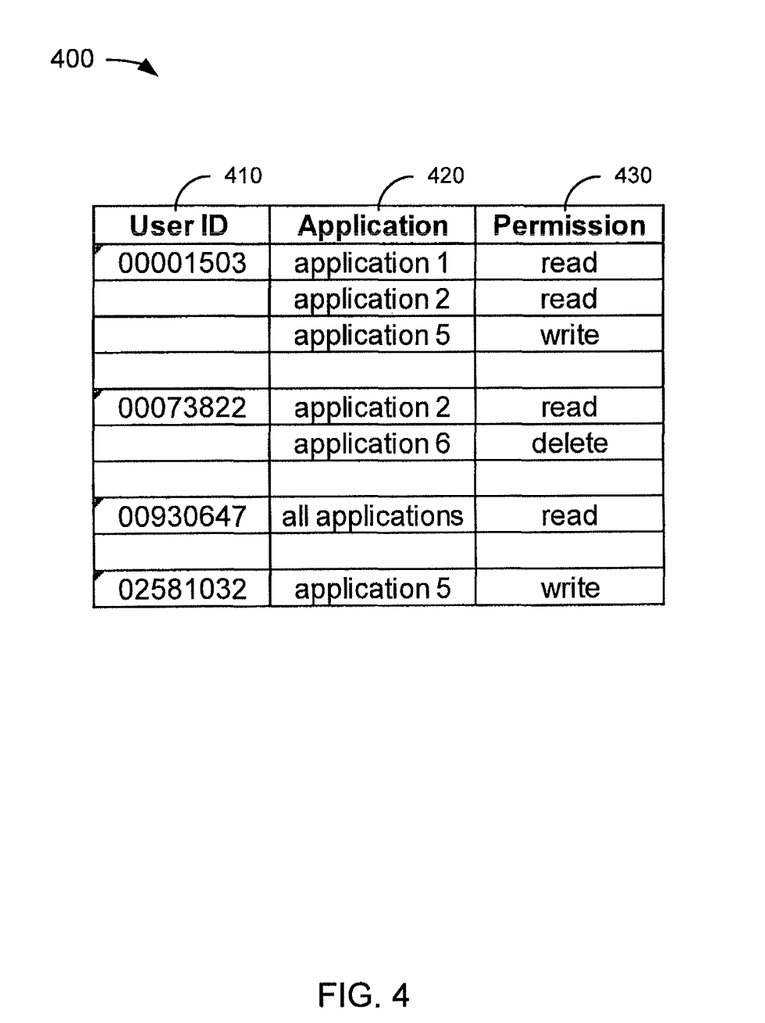
FIG. 4 shows an example of a data structure used in a security access system using RFID tag proximity.

An example of a data structure 400 used by an RFID tag proximity security system is shown in FIG. 4. A user identification number is listed in the first column 410. Alternatively, data which may be written into a configurable data area on an RFID tag may occupy the first column. Examples of configurable data include, but are not limited to, the group an employee works for, and information identifying an authorized client of a software package.

The applications accessible from the computer by the particular user are listed in the second column 420 of the data structure 400. Alternatively, overall access to the computer may be listed in the second column 420.

The permissions for each of the applications granted to a particular user are listed in the third column 430 of the data structure 400. Permissions may include, but are not limited to, reading only with no permission to add or delete data (read), reading and writing with permission to add data but not to delete data (write), and reading and writing with permission to add and delete data (delete). Thus, some users have only certain rights with respect to certain applications, databases, etc., as defined by the data structure. Such permissions may be implemented using, e.g., access control lists (ACLs) within an operating system such as Microsoft Windows.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the techniques discussed herein to the precise form disclosed above. While specific embodiments of, and examples for, the invention are described above for illustrative purposes, various equivalent modifications are possible within the scope of this application, as those skilled in the relevant art will recognize. For example, while an RFID reader for reading RFID tags is mentioned, any reading apparatus for reading devices emitting radio-frequency signals may be used under the principles disclosed herein. Further any specific numbers noted herein are only examples: alternative implementations may employ differing values or ranges.

The teachings of the techniques provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the concepts can be practiced in many ways. Details of the system may vary considerably in its implementation details, while still being encompassed by the techniques disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the techniques discussed herein to the specific embodiments disclosed in the specification, unless the above Detailed Description section explicitly defines such terms. Accordingly, the actual scope of this application encompasses not only the disclosed embodiments, but also all equivalent ways of practicing or implementing the techniques discussed herein under the claims.

What is claimed is:

1. A system for granting security access to one or more software applications on a computer, comprising:
an RFID reader configured to:
scan an RFID tag that is within a proximity range of the computer, and
read identification data associated with the RFID tag;
a database storing security access information; and
a processor that:
compares the identification data associated with the RFID tag to the security access information stored in the database in response to the RFID tag being detected to be within the proximity range;
after determining that the identification data of the RFID tag matches the security access information, the processor:
determines which selected software applications that the user has the right to access by sending an inquiry to the database and receiving a response indicating which selected software applications that the user has the right to access;
grants access to only the selected software applications on the computer if the comparison of the identification data associated with the RFID tag and the security access information associated with the identification data is favorable; and
after the granting of access, determines if the RFID tag is still in the proximity range, and if the RFID tag is determined to still be within the proximity range, continues to grant access to the selected software applications, but if the RFID tag is determined to no longer be within the proximity range, denies access to the selected software applications; and
after determining that the identification data of the RFID tag does not match the security access information, the processor denies access to the selected software applications,
wherein after the granting of access and if the RFID tag is not be within the proximity range, the processor:
determines that the RFID tag has not been within the proximity range by determining that a lag time between the RFID tag and the RFID reader is greater than a predetermined threshold, and
denies access to the selected software applications in response to determining that the lag time is greater than the predetermined threshold.

2. The system of claim 1 wherein the RFID reader comprises at least two antennas having a known separation to receive a signal from the RFID tag and a processor to determine a lag time between detecting the signal at each antenna and the signal strengths at each antenna to determine a location of the RFID tag.

3. The system of claim 1 wherein the RFID reader or processor uses global positioning system data corresponding to the RFID tag to determine a location of the RFID tag.

4. The system of claim 1 wherein the RFID reader or processor is further configured to decrypt encrypted identification data.

5. A method of granting security access to one or more software applications on a computer, comprising:
   receiving a first identification data associated with a first RFID tag, wherein the first RFID tag is within a proximity range of an RFID reader or the computer;
   comparing the first identification data associated with a first RFID tag to security access information associated with the RFID tag stored in a database;
   after determining that the first identification data of the RFID tag matches the security access information, determining which pre-selected software applications that the user has the right to access;
   granting access to a first user to only the pre-selected applications on the computer that the user is determined to have access rights to;
   denying access to the pre-selected software in response to determining that the first identification data of the RFID tag does not match the security access information;
   reading a second identification data associated with the second RFID tag in response to a second RFID tag being within the proximity range of the computer;
   comparing the second identification data to security access information stored in the database; and
   removing the first user's access to one or more selected applications on the computer if the second identification data is not found based on the comparison of the second identification data to the database, and otherwise continue permitting access to the first user;
   after the granting of access to the first user, determining if the RFID tag is still in the proximity range, and if the RFID tag is determined to still be within the proximity range, continuing to grant access to the first user to the selected applications, but if the RFID tag is determined to not be within the proximity range, denying access to the first user to the selected applications;
   after the granting of access and if the REID tag is not be within the proximity range, determining that the RFID tag has not been within the proximity range by determining that a lag time between the RFID tag and the REID reader is greater than a predetermined threshold; and
   denying access to the selected software applications in response to determining that the lags time is greater than the predetermined threshold.

6. The method of claim 5, further comprising decrypting the first identification data associated with the first RFID tag, wherein the first identification data is encrypted.

7. The method of claim 5 wherein scanning for the first RFID tag occurs upon prompting by the first user.

8. The method of claim 5 wherein granting access to selected applications occurs subject to one or more other computer security systems.

9. A method of granting security access to one or more applications on a computer, comprising:
   when a first RFID tag is within a proximity range of the RFID reader, receiving, from an RFID reader, first identification data associated with the first RFID tag;
   determining if there is security access information in a database that is associated with the first identification data of the RFID tag;
   after determining there is security access information in the database associated with the first identification data of the RFID tag, determining which selected software applications the user has the right to access based on security permissions defined by the security access information associated with the RFID tag in the database;
   granting access to only the selected applications or data on the computer that the user is allowed to access if there is security access information in the database associated with the first identification data of the RFID tag;
   denying access to the selected software applications if there is no security access information in the database associated with the first identification data of the RFID tag;
   after the granting of access, determining if the RFID tag is still in the proximity range, and if the RFID tag is determined to still be within the proximity range, continuing to grant access to the selected applications, but if the RFID tag is determined to no longer be within the proximity range, denying access to the selected applications;
   after the granting of access and if the RFID tag is not be within the proximity range, determining that the RFID tags has not been within the proximity range by determining that a lag time between the RFID tag and the REID reader is greater than a predetermined threshold, and
   denying access to the selected software applications in response to determining that the lag time is greater than the predetermined threshold.

10. The method of claim 9, further comprising determining a proximity of the first RFID tag from the computer, wherein determining a proximity of the first RFID tag from the computer comprises using a received signal strength from the first RFID tag.

11. The method of claim 9, further comprising determining a proximity of the first RFID tag from the computer, wherein determining a proximity of the first RFID tag from the computer comprises using at least two antennas having a known separation to receive a signal from the RFID tag and using a signal strength at each antenna and a lag time between detecting the signal at each antenna to determine a location of the RFID tag.

12. The method of claim 9, further comprising determining a proximity of the first RFID tag from the computer, wherein determining a proximity of the first RFID tag from the computer comprises using a global positioning system to determine a location of the RFID tag.

13. The method of claim 9, further comprising:
   searching for a second RFID tag;
   determining a proximity of the second RFID tag from the computer;
   reading a second identification data associated with the second RFID tag if the proximity from the computer is within a predetermined distance, and otherwise ignoring the second RFID tag;
   comparing the second identification data to the database of security access information; and removing the first user's access to one or more selected applications on the computer if the second identification data is not found based upon information in the database for the one or more selected applications, and otherwise continue permitting access to the first user.

14. An RFID tag comprising:

antenna receive an inquiry from an RFID reader when the RFID tag is with a proximity range of the RFID reader;

memory; and identification data associated with a user ID, the identification data stored in the memory;

wherein upon receiving the inquiry from the RFID reader, a comparison is made as to whether the identification data associated with the RFID tag matches security access information in a database in response to the RFID tag being detected to have entered the proximity range, wherein access is granted to only the selected applications on the computer if the comparison of the identification data associated with the RFID tag and the security access information of a user associated with the identification data of the RFID tag is favorable based on the RFID tag entering the proximity area, wherein the access is limited to specified permissions indicated in the security access information, wherein access is denied to the selected applications if the comparison of the identification data associated with the RFID tag and the specific software permissions is not favorable and if the RFID tag is within the proximity range, and wherein, after the granting of access, a determination is made as to whether the RFID tag is still in the proximity range, and if the RFID tag is determined to still be within the proximity range, continuing to grant access to the selected applications, but if the RFID tag is determined to no longer be within the proximity range, a determination is made that the RFID tag has not been within the proximity range by determining that a lag time between the RFID tag and the RFID reader is greater than a predetermined threshold, and denying access to the selected applications.

* * * * *